US012800021B2

(12) United States Patent
Manica et al.

(10) Patent No.: US 12,800,021 B2
(45) Date of Patent: Nov. 17, 2026

(54) DUAL-SUMP TRANSMISSION

(71) Applicant: DANA ITALIA S.R.L., Trentino (IT)

(72) Inventors: Giuseppe Manica, Isera (IT); Giacomo Faggiani, Rovereto (IT); Pier Paolo Rinaldi, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/644,492

(22) Filed: Apr. 24, 2024

(65) Prior Publication Data

US 2025/0334174 A1 Oct. 30, 2025

(51) Int. Cl.
*F16H 57/04* (2010.01)

(52) U.S. Cl.
CPC ..... *F16H 57/0408* (2013.01); *F16H 57/0452* (2013.01); *F16H 57/0436* (2013.01)

(58) Field of Classification Search
CPC ............. F16H 57/0408; F16H 57/0442; F16H 57/045; F16H 57/0452; F01M 11/0408; F01M 11/0458; F01M 2011/0095; F01M 2011/0416
See application file for complete search history.

(56) References Cited

U.S. PATENT DOCUMENTS

| | | | | |
|---|---|---|---|---|
| 1,540,577 | A * | 6/1925 | Thamm | F01M 1/02 184/6 |
| 3,625,310 | A * | 12/1971 | Herrick | F16N 19/003 184/6.12 |
| 6,644,439 | B2 * | 11/2003 | Schnitzer | F16H 57/0456 184/6.12 |
| 7,213,682 | B2 * | 5/2007 | Gibson | F16H 57/0421 184/6.12 |
| 9,677,436 | B2 | 6/2017 | Mordukhovich | |
| 10,415,692 | B2 * | 9/2019 | Lapeyre | F16H 57/0436 |
| 11,835,126 | B2 * | 12/2023 | Deport | F16N 29/00 |
| 2004/0226774 | A1 * | 11/2004 | Gunderson | F01M 11/0408 184/1.5 |
| 2007/0209876 | A1 * | 9/2007 | Sato | F16H 57/0408 184/1.5 |
| 2007/0261922 | A1 * | 11/2007 | Mullen | F16N 39/00 184/6.12 |

FOREIGN PATENT DOCUMENTS

| | | | |
|---|---|---|---|
| CN | 105276172 | A | 1/2016 |
| JP | 2015197150 | A | 11/2015 |

* cited by examiner

*Primary Examiner* — Minh Truong
(74) *Attorney, Agent, or Firm* — McCoy Russell LLP

(57) ABSTRACT

Methods and systems for building a dual sump transmission are described. In one example, a passage may extend from a second sump to a first sump so that fluid may be drained from the second sump and the first sump via removing a sole plug. In another example, an extension rod may extend from the first sump to the second sump so that fluid may be drained from the first sump and the second sump via removing the extension rod.

16 Claims, 5 Drawing Sheets

DUAL-SUMP TRANSMISSION

FIELD

The present description relates generally to a dual-sump transmission lubrication system for a vehicle.

BACKGROUND AND SUMMARY

A vehicle may include a transmission to deliver torque from a propulsion source to vehicle wheels. The transmission may allow the propulsion source to operate in an efficient operating region so that energy may be conserved. In addition, the transmission may also allow the propulsion source to deliver large amounts of torque at low vehicle speeds to increase vehicle speed. The transmission may include a sump that holds transmission fluid (e.g., oil), and a pump may draw fluid from the sump and direct the fluid to lubricate components within the transmission. Single sump transmissions may be subject to splashing of fluid within the transmission, and splashing fluid within the transmission may increase transmission losses. One way to reduce transmission losses and ensure adequate transmission component lubrication may be to include a second sump. Fluid from the first sump may be pumped to the second sump (e.g., a calming sump) where aeration of the fluid may be reduced so that the fluid may be distributed efficiently. However, the second sump may trap transmission fluid during maintenance when transmission fluid is replaced to remove impurities and restore desired levels of lubrication within the transmission. One way to remove fluid from the second sump may be to flush the transmission fluid from the transmission using specialized equipment, but this may be time consuming and increase fluid use. For these reasons, it may be desirable to provide a transmission that offers the benefits of a dual sump transmission without its oil replacement issues.

The inventors herein have recognized the above-mentioned issues and have developed a lubrication system for a transmission, comprising: a first sump including a first sump drain through hole; and a second sump including a second sump drain through hole.

By including a sump drain through hole in the second sump, it may be possible to replace substantially all fluid in a transmission that includes two sumps without having to flush the transmission. In particular, a sump drain through hole in a second sump may allow fluid to exit the second sump when fluid in the transmission is being replaced. During normal operation, the sump drain through hole may be plugged so that the second sump retains fluid. The second sump may reduce splashing of fluid in the transmission so that transmission losses may be reduced. In addition, the second sump may reduce aeration of fluid held in the second sump, thereby providing increased lubrication via the fluid.

The present description may provide several advantages. Specifically, the approach may provide more efficient and through fluid replacement for a transmission. Further, the approach may simplify a fluid replacement process for the transmission. Additionally, the approach may reduce financial expenses for replacing transmission fluid.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
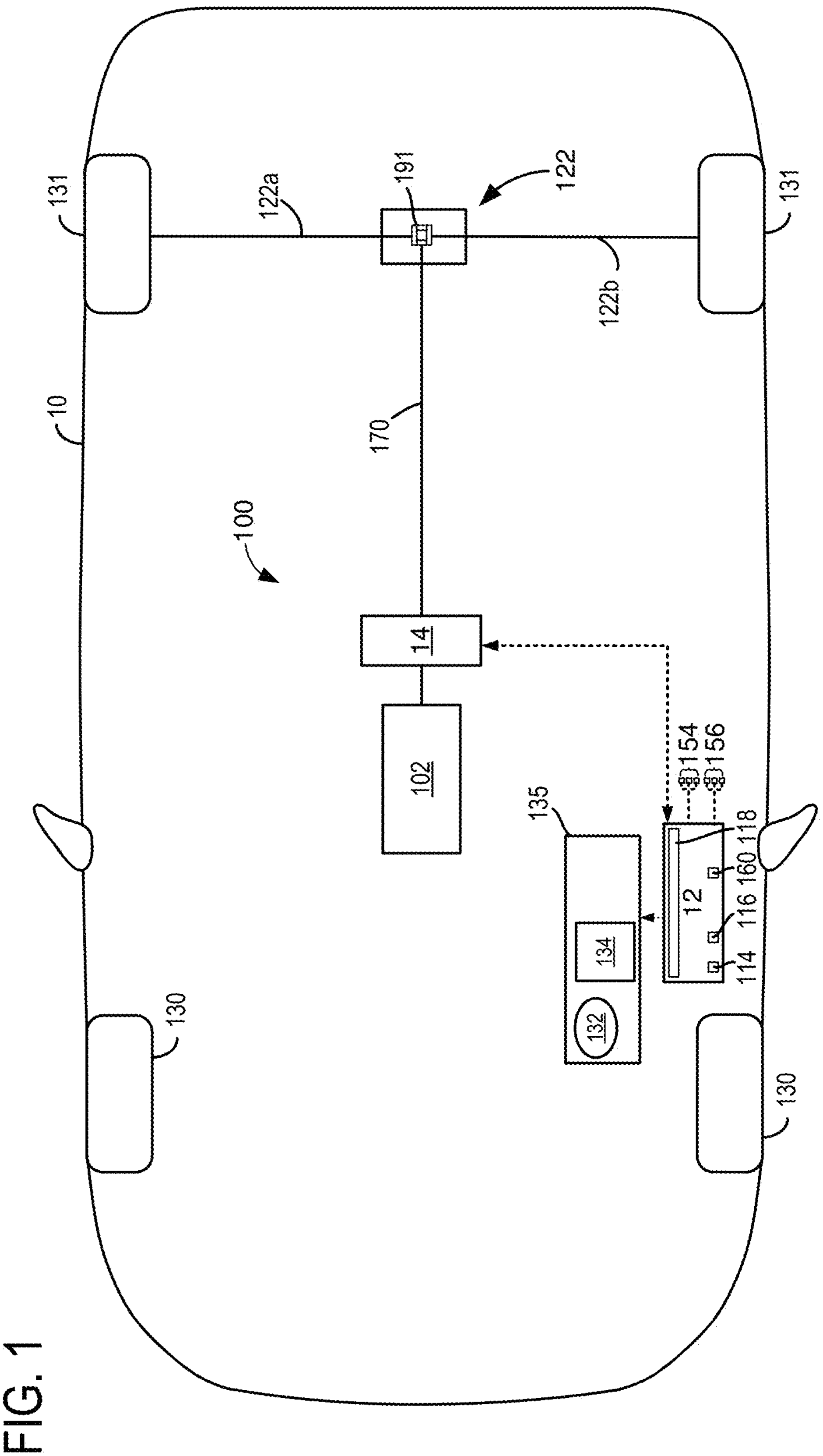
FIG. 1 is a schematic diagram of a vehicle driveline that includes a dual sump transmission.

The following description relates to fabricating a dual sump transmission. The dual sump transmission may exhibit lower losses due to reduced fluid splashing within the transmission and increased lubrication of moving transmission components. The dual sump transmission allows its second sump to be drained of fluid without having to flush the transmission. FIG. 1 shows an example vehicle that includes the dual sump transmission. FIGS. 2-7 show different dual sump transmission configurations. FIG. 8 is shows a flowchart of a method for a dual sump transmission.

FIG. 1 illustrates an example vehicle propulsion system 100 for vehicle 10. Vehicle propulsion system 100 includes at least one propulsion source 102. The propulsion source 102 may be an electric machine, an internal combustion engine, or a combination of an electric machine and an internal combustion engine. Throughout the FIG. 1, mechanical connections between various components are illustrated as solid lines, whereas electrical connections between various components are illustrated as dashed lines.

Vehicle propulsion system 100 may include a front axle (not shown) and a rear axle 122. In some examples, rear axle may comprise two half shafts, for example first half shaft 122*a*, and second half shaft 122*b*. Vehicle propulsion system 100 further has front wheels 130 and rear wheels 131. The rear axle 122 is coupled to transmission 14 via driveshaft 170. Rear axle 122 may transfer power from propulsion source 102 to generate rotation of drive wheels 131. Rear axle 122 may include a differential 191.

Transmission 14 is dual sump transmission. Transmission 14 may be a step ratio transmission or another type of transmission that includes two sumps (e.g., transmission fluid storage and/or collection reservoirs). As such, it may be appreciated that the example transmission configurations described herein are not to be considered as limiting the scope of the present description.

Controller 12 may communicate with actuators and sensors of transmission 14. An additional controller, or controller 12, may communicate with actuators and sensors of propulsion source 102. Controller 12 may also receive gear requests and requests for output of propulsion source 102 from a human operator (not shown), or an autonomous controller (not shown). Controller 12 is shown receiving information from a plurality of sensors 154 (various examples of which are described herein) and sending control signals to a plurality of actuators 156 (various examples of which are described herein). As one example, sensors 154 may include a transmission input shaft speed sensor, a transmission output shaft speed sensor, shift fork position sensors, shift actuator position sensors, a transmission range (TR) sensor and fork position sensors to detect position of gear selector forks (e.g., 372, 376, 378, 382 of FIG. 3), and transmission temperature sensors. Actuators 156 may include fluid pumps and clutch actuators (e.g., motors, hydraulic cylinders, or solenoids).

Vehicle 10 may include dashboard 135 with a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller (e.g. 12). As such, in some examples, the vehicle operator may communicate via display system 132 with an internet site or software application (app).

Dashboard 130 may further include an operator interface 134 via which the vehicle operator may adjust the operating status of the vehicle including transmission 14. Specifically, the operator interface 134 may be configured to initiate and/or terminate operation of the vehicle driveline (e.g., propulsion source 102 and transmission 14) based on an operator input. Various examples of the operator interface 134 may include interfaces that utilize a physical apparatus, such as an active key, that may be inserted into the operator interface 134 to start the propulsion source 102 and turn on the vehicle, or may be removed to shut down the propulsion source 102 and turn off the vehicle. Display system 132 and operator interface 134 may also communicate with controller 12 to exchange data.

Controller 12 may include a processor 114, read-exclusive memory (non-transitory memory) 116, random access memory 160, and inputs/outputs 118 (e.g., digital inputs, digital outputs, analog inputs, analog outputs, counters/timers, and communications ports).

Figure 2:
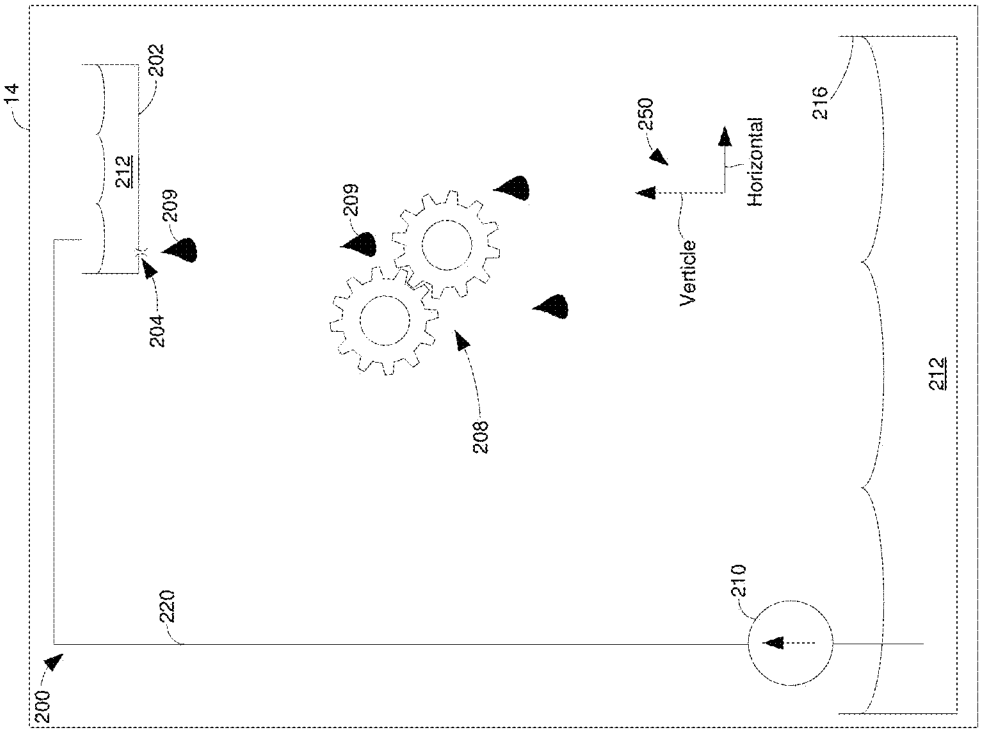

Referring now to FIG. 2, a lubrication system 200 of a transmission 14 is shown. Axis 250 indicates vertical and horizontal directions. The vertical height of an object increases from earth ground in the direction of the vertical axis.

Transmission 14 includes a first sump 216 that is configured to hold and/or store transmission fluid 212. A lift pump 210 may transfer transmission fluid 212 from first sump 216 to second sump 202. Second sump 202 is located vertically above first sump 216. Second sump 202 is also configured to hold and/or store transmission fluid 212. A lift pump 210 that may be electrically or mechanically driven, selectively lifts transmission fluid 212 from first sump 216 to second sump 202 via conduit 220. In this example, second sump 202 includes an orifice 204 that allows transmission fluid to flow from second sump to rotatable transmission components 208 (e.g., gears, shafts, clutches, etc.). In this example, gravitational force may cause drops 209 of transmission fluid to move from second sump 202 to rotatable transmission components 208.

Figure 3:
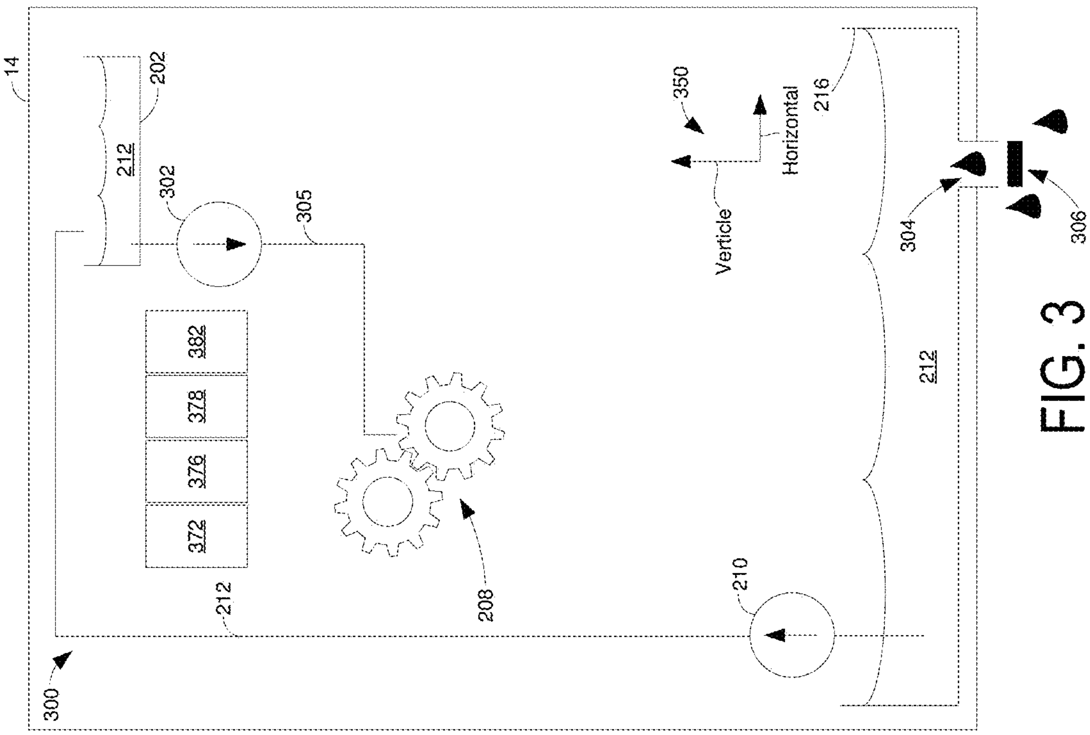
FIGS. 2-7 show schematic diagrams of example dual sump transmissions.

Referring now to FIG. 3, an alternative lubrication system 300 of a transmission 14 is shown. Axis 350 indicates vertical and horizontal directions. The vertical height of an object increases from earth ground in the direction of the vertical axis. The lubrication system 300 of transmission 14 shown in FIG. 3 includes some of the same components that are shown in FIG. 2. Components of FIG. 3 that have the same numerical identifiers as components that are shown in FIG. 2, are the same components. Therefore, for the sake of brevity, the description of these components is not repeated.

In this example, transmission 14 includes several features that are not shown in the system of FIG. 2. Specifically, the system of FIG. 3 includes an optional pump 302 that may supply pressurized transmission fluid 212 to rotatable transmission components 208 via conduit 305. In addition, transmission 14 includes a first sump drain through hole 304 and a first sump drain hole plug 306. The first sump drain through hole 304 may be circular in shape. Further, the first sump drain through hole 304 may include threads. Similarly, first sump drain hole plug 306 may be circular in shape and it may include threads. The first sump drain through hole 304 may allow transmission fluid to be drained from the first sump 216.

Figure 5:
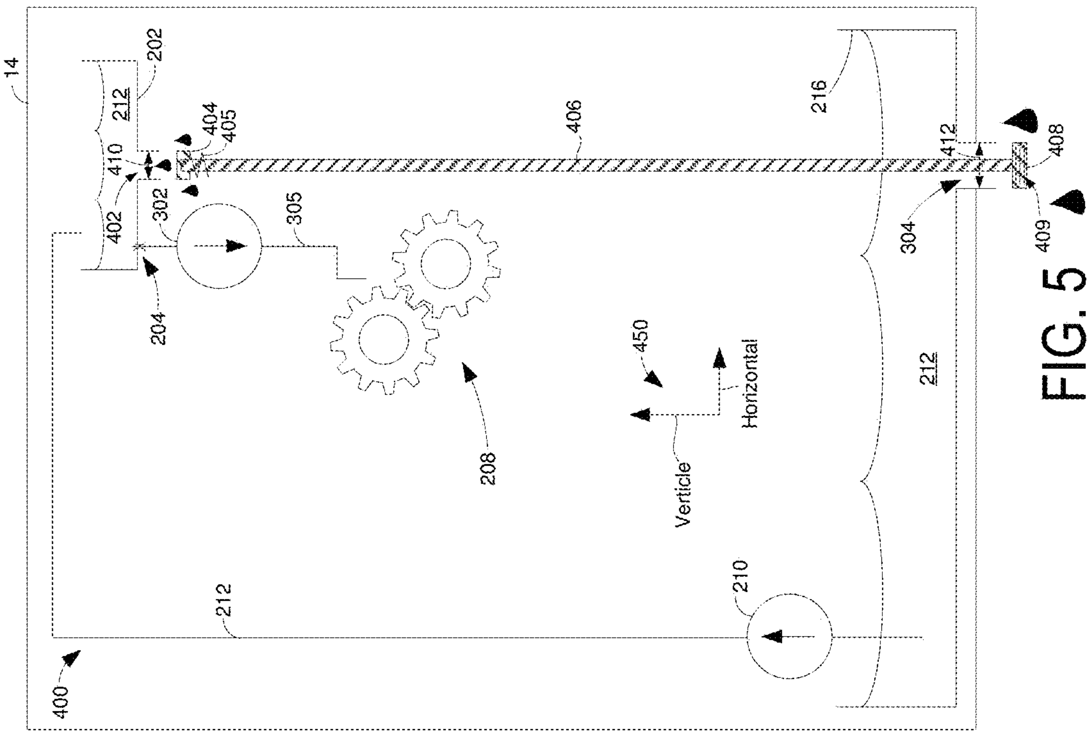
Figure 4:
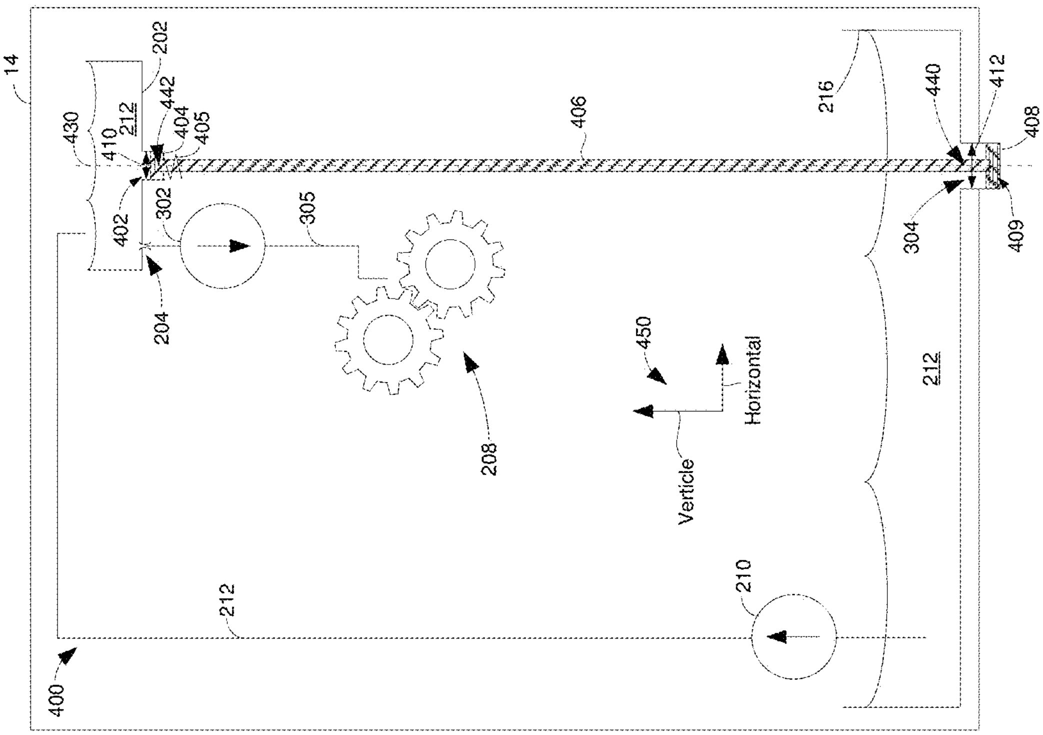

Referring now to FIGS. 4 and 5, an alternative lubrication system 400 of a transmission 14 is shown. FIG. 4 shows the alternative lubrication system 400 is a sealed configuration where transmission fluid is held within transmission 14 and prevented from being replaced. FIG. 5 shows the alternative lubrication system 400 in an open or unsealed configuration where transmission fluid is allowed to drain and exit the transmission 14. Axis 450 indicates vertical and horizontal directions. The vertical height of an object increases from earth ground in the direction of the vertical axis. The lubrication system 400 of transmission 14 shown in FIGS. 4 and 5 includes some of the same components that are shown in FIGS. 2 and 3. Components of FIGS. 4 and 5 that have the same numerical identifiers as components that are shown in FIGS. 2 and 3, are the same components. Therefore, for the sake of brevity, the description of these components is not repeated.

Transmission 14 is shown with optional pump 302 supplying transmission fluid to rotatable transmission components 208. In other examples, transmission fluid may be supplied to rotatable transmission components 208 via orifice 206 with optional pump 302 removed.

In this example, transmission 14 includes several features that are not shown in the systems of FIGS. 2 and 3. Specifically, the system of FIG. 4 includes an extension rod 406 that allows for draining of first sump 216 and second sump 202 at a same time or together. In this example, first sump drain through hole 304 is circular in shape and it has a diameter 412. Here, first sump drain through hole 304 is fully blocked or filled by first plug 408. First plug 408 is coupled to extension rod 406 and it includes threads 409 that allow extension rod 406 and first plug 408 to be screwed into first sump drain through hole 304. Second plug 404 is also coupled to extension rod 406 and it may be formed of an elastic material so that it may be compressed against second sump 202. In this example, it includes a spring 405 to compress second plug 404 against second sump 202. In alternative embodiments, second plug 404 may be threaded and it may interface with threads in second sump 202. Second sump 202 includes a second sump drain through hole 402 that has a diameter 410. In this example, the diameter 412 of first sump drain through hole 304 is larger than the diameter 410 of second sump drain through hole 402. This allows the entirety of extension rod 406 to be removed from transmission 14. However, in other examples, diameter 410 may be a same size or larger than diameter 412. As shown, second plug 404 fully blocks or fills second sump drain through hole 402 during normal operation of transmission 14 so that transmission fluid may be retained in second sump 202. Likewise, first plug 408 fills first sump drain through hole 304 during normal operation of transmission so that transmission fluid may be retained in first sump 216.

Line 430 is a centerline for first sump drain through hole 304 and second sump drain through hole 402 and it shows that center 440 of first sump drain through hole 304 is in vertical alignment with center 442 of second sump drain through hole 402.

FIG. 5 shows transmission 14 with extension rod 406 partially removed. This allows transmission fluid 212 to drain from second sump 202 and flow into first sump 216. However, extension rod 406 may be fully removed from transmission 14. Transmission fluid 212 in first sump 216 may exit the transmission 14 with the extension rod 406 partially or fully removed. When extension rod 406 is partially or fully removed, first sump drain through hole 304 is no longer fully blocks first sump drain through hole 304, which allows transmission fluid to exit the transmission 14. Additionally, second sump drain through hole 402 is no longer fully blocked when extension rod 406 is partially or fully removed so that transmission fluid may drain from second sump 202 to first sump 216 as shown.

Figure 6:
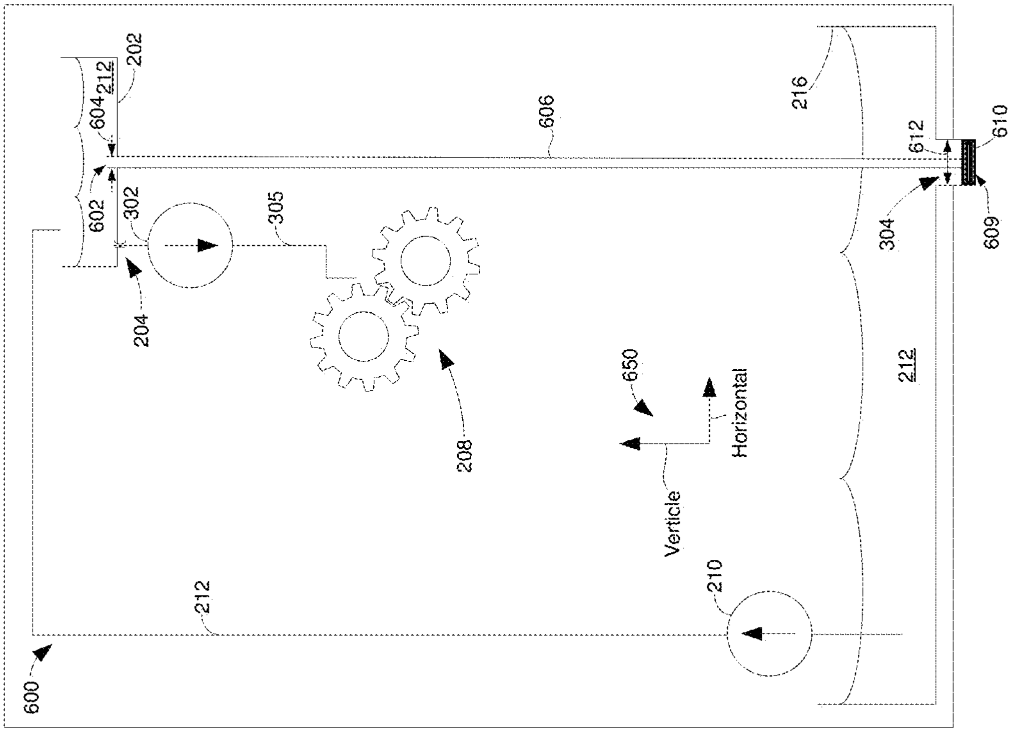
Figure 7:
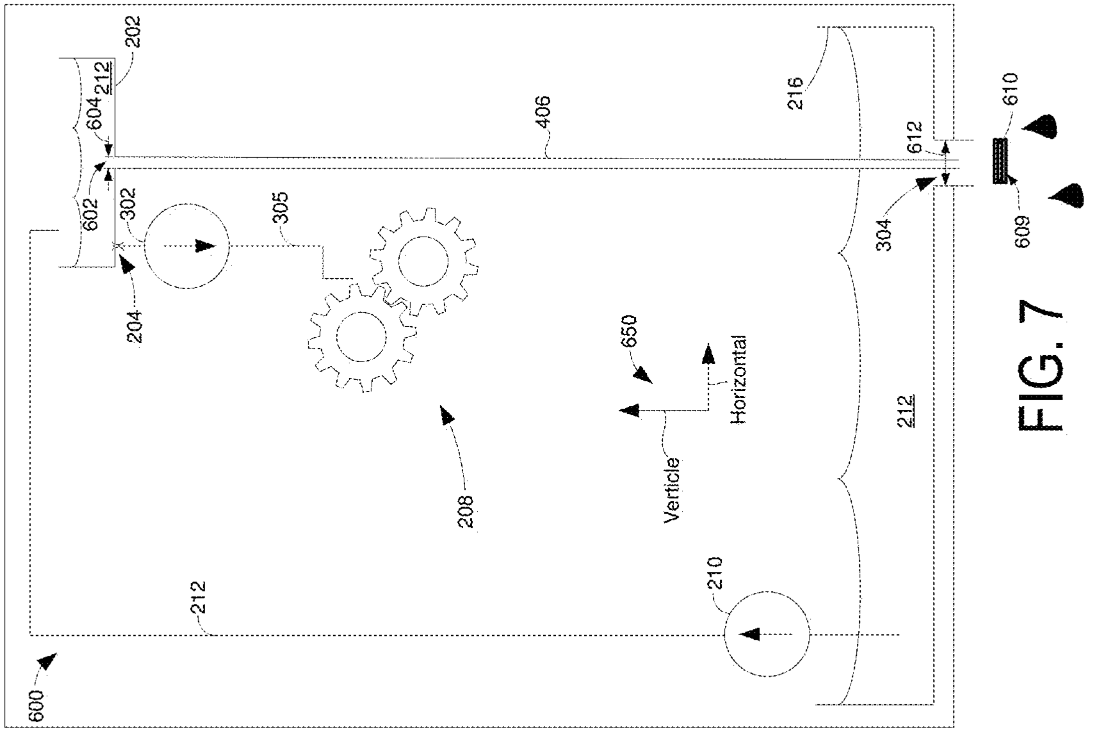
Figure 8:
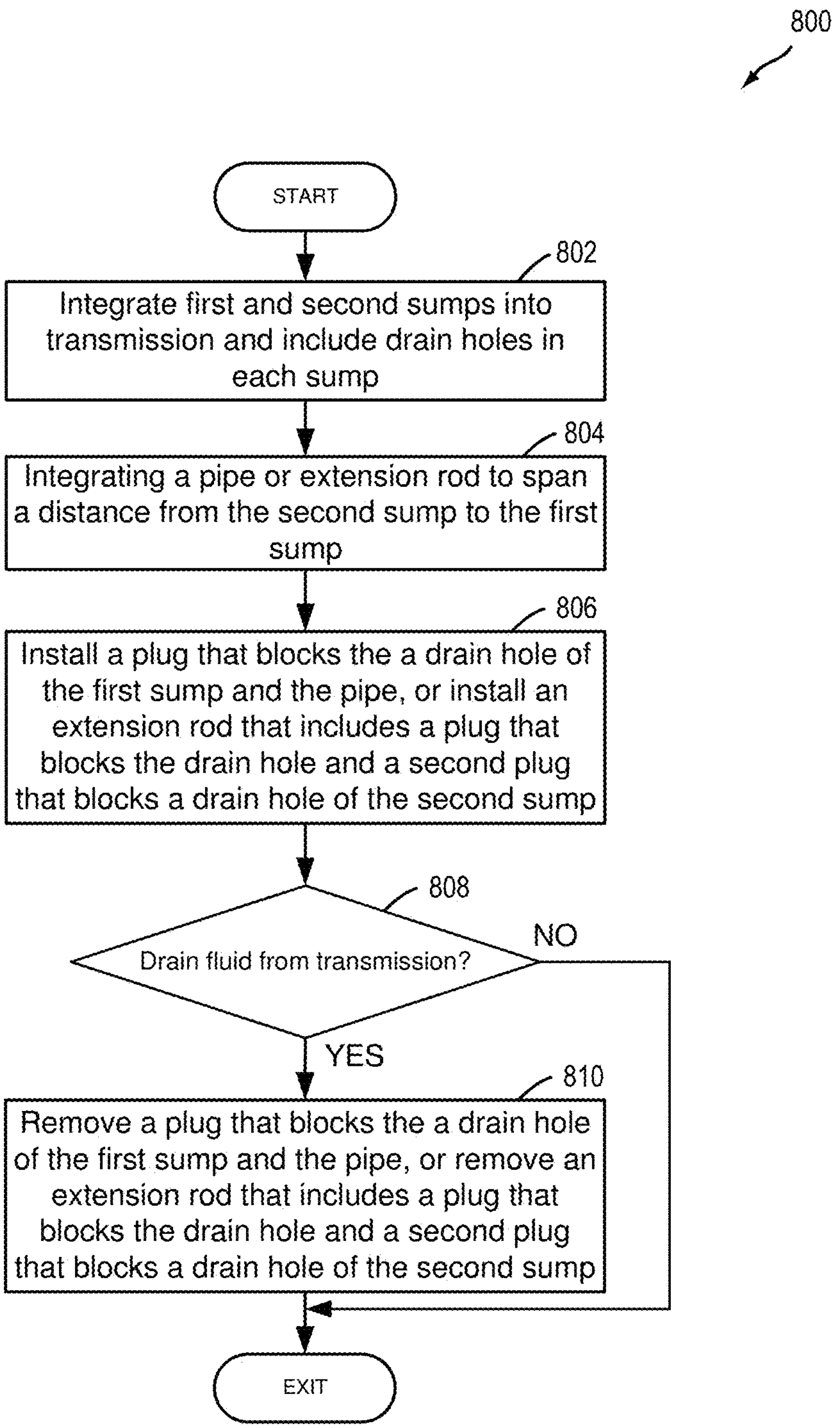
FIG. 8 shows a flowchart of a method for a dual sump transmission.

Referring now to FIGS. 6 and 7, an alternative lubrication system 600 of a transmission 14 is shown. FIG. 6 shows the alternative lubrication system 600 is a sealed configuration where transmission fluid is held within transmission 14 and prevented from being replaced. FIG. 7 shows the alternative lubrication system 400 in an open or unsealed configuration where transmission fluid is allowed to drain and exit the transmission 14. Axis 650 indicates vertical and horizontal directions. The vertical height of an object increases from earth ground in the direction of the vertical axis. The lubrication system 600 of transmission 14 shown in FIGS. 6 and 7 includes some of the same components that are shown in FIGS. 2 and 3. Components of FIGS. 6 and 7 that have the same numerical identifiers as components that are shown in FIGS. 2 and 3, are the same components. Therefore, for the sake of brevity, the description of these components is not repeated.

Transmission 14 is shown with optional pump 302 supplying transmission fluid to rotatable transmission components 208. In other examples, transmission fluid may be supplied to rotatable transmission components 208 via orifice 206 with optional pump 302 removed.

In this example, transmission 14 includes several features that are not shown in the systems of FIGS. 2-5. Specifically, the system of FIG. 6 includes a drain tube, pipe, or conduit 606 that allows for draining of first sump 216 and second sump 202 at a same time or together. In this example, first sump drain through hole 304 is circular in shape and it has a diameter 604. Drain tube, pipe, or conduit 606 is in communication with second sump drain through hole 602 creating a seal between second sump 202 and first plug 610. Drain tube, pipe, or conduit 606 extends from second sump 202 to first sump drain through hole 304. As shown, first plug 610 fully blocks drain tube, pipe, or conduit 606 to prevent transmission fluid from flowing to first sump 216 or out of first sump drain through hole 304. First plug 610 fills first sump drain through hole 304 during normal operation of transmission so that transmission fluid may be retained in first sump 216 and in second sump 202. First plug 610 may include threads 609 to interface with threads in transmission 14 (not shown). Thus, first plug 610 serves a dual purpose of closing first sump 216 from fluid drainage and closure of drain tube, pipe, or conduit 606. When drain tube, pipe, or conduit 606 is removed from transmission, first sump 216 and second sump 202 may be drained together, thereby allowing both sumps to be fully drained.

FIG. 7 shows transmission 14 with first plug 610 removed. This allows transmission fluid 212 to drain from second sump 202 and flow out of transmission 14 via first sump drain through hole 304. Drain tube, pipe, or conduit 606 may be filled with transmission fluid 212 when first plug 610 is installed as shown in FIG. 6.

Thus, the system of FIGS. 1-7 provides for a lubrication system for a transmission, comprising: a first sump including a first sump drain through hole; and a second sump including a second sump drain through hole. In a first example, the lubrication system includes where a center of the second sump drain through hole is vertically aligned with a center of the first sump drain through hole. In a second example that may include the first example, the lubrication system includes where the first sump drain through hold is circular, and where the second sump drain through hold is circular. In a third example that may include one or both of the first and second examples, the lubrication system includes where the second sump is positioned vertically above the first sump. In a fourth example that may include one or more of the first through third examples, the lubrication system further comprises a pump and a conduit extending from the pump to the second sump. In a fifth example that may include one or more of the first through fourth examples, the lubrication system includes where the pump is configured to draw fluid from the first sump. In a sixth example that may include one or more of the first through fifth examples, the lubrication system further comprises a pipe extending from the first sump drain through hole to the second sump drain through hole. In a seventh example that may include one or more of the first through sixth examples, he lubrication system further comprises a plug, the plug configured to block fluid flow through the pipe and the second sump drain through hole.

The system of FIGS. 1-7 also provides for a lubrication system for a transmission, comprising: a first sump including a first sump drain through hole; a second sump including a second sump drain through hole, the second sump positioned vertically above the first sump; and a first pump configured to deliver a fluid from the first sump to the second sump. In a first example, the lubrication system further comprises a passage extending from the second sump drain through hole to the first sump drain through hole. In a second example that may include the first example, the lubrication system further comprises a plug configured to block the first sump drain through hole and the passage. In a third example that may include one or both of the first and second examples, the lubrication system further comprises a second pump configured to deliver the fluid to one or more rotatable transmission components. In a fourth example that may include one or more of the first through third examples, the lubrication system further comprises an extension rod extending from the second sump drain through hole to the first sump drain through hole.

Referring now to FIG. 8, an example method for a transmission is shown. The method of FIG. 8 may be performed via a human or a machine on a vehicle assembly line. The method of FIG. 8 describes actions that may be performed in the physical world via a human or a machine.

At 802, method 800 integrates a first sump and a second sump into a transmission. The first and second sumps may be integrated such that the second sump is positioned vertically above the first sump as shown in FIGS. 2-7. Additionally, the first and second sumps may include drain holes as shown in FIGS. 4-7. Method 800 proceeds to 804.

At 804, method 800 integrates a pipe or an extension rod into the transmission. The pipe extends from the second sump to the drain hole of the second sump as shown in FIGS. 6 and 7. The pipe allows fluidic communication between the second sum and a plug as shown in FIGS. 6 and 7. Alternatively, an extension rod may be integrated into the transmission. The extension rod extends from the first sump to the second sump. Method 800 proceeds to 806.

At 806, method 800 includes installing a plug the blocks the drain hole of the first sump and the pipe. The plug prevents transmission fluid from exiting the transmission. Alternatively, when extension rod is applied, a first plug of the extension rod plugs or covers a through hole in the first sump and a second plug of the extension rod plugs or covers a through hole in the second pump. These actions prevent transmission fluid from exiting the transmission. Additionally, the second plug prevents transmission fluid from entering the first sump via the through hole in the second sump. Method 800 proceeds to 808.

At 808, method 800 judges whether or not to drain fluid from the transmission. If fluid is to be drained from the transmission, the answer is yes and method 800 proceeds to 810. Otherwise, the answer is no and method 800 proceeds to exit.

At 810, method 800 includes removing a plug that blocks a first sump drain through hole and a pipe that extends from the second sump. By removing this sole plug, the first sump and the second sump may be drained of fluid at a same time or together. Alternatively, method 800 includes removing a first plug that is blocking a first sump drain through hole and a second plug that is blocking a second sump drain through hole. By removing these two plugs, the first sump and the second sump may be drained of fluid together at a same time. Method 800 proceeds to exit.

In this way, a dual sump transmission may be constructed and serviced. The extension rod or the pipe allows a second sump to be drained while a first sump is being drained, thereby reducing transmission servicing difficulty.

Thus, the method of FIG. 8 provides for a method for a transmission of a vehicle, comprising: integrating a first sump including a first sump drain through hole in the transmission; and integrating a second sump including a second sump drain through hole in the transmission. In a first example, the method further comprises integrating a pipe from the first sump drain through hole to the second sump drain through hole. In a second example that may include the first example, the method further comprises installing a plug into the first sump drain through hole that blocks the first sump drain through hole and the pipe. In a third example that may include one or both of the first and second examples, the method further comprises removing the plug and draining the first sump and the second sump via the first sump drain through hole to replace a fluid in the transmission. In a fourth example that may include one or more of the first through third examples, the method further comprises installing an extension rod from the first sump drain through hole to the second sump drain through hole. In a fifth example that may include one or more of the first through fourth examples, the method further comprises blocking the first sump drain through hole via a first plug that is attached to the extension rod and blocking the second sump drain through hole via a second plug that is attached to the extension rod. In a sixth example that may include one or more of the first through fifth examples, the method further comprises removing the first plug from the first sump drain through hole to drain the first sump and removing the second plug from the second sump through drain hole to drain the second sump to replace a fluid in the transmission.

Note that the example methods included herein can be applied to a variety of transmission types and configurations. The method and its associated actions may be performed in the sequence illustrated, in parallel, or in some cases omitted. Likewise, the order of processing is may be modified to achieve the features and advantages of the example examples described herein, but is provided for ease of illustration and description. One or more of the illustrated actions, operations and/or functions may be repeatedly performed depending on the particular strategy being used.

It will be appreciated that the configurations and methods disclosed herein are exemplary in nature, and that these specific examples are not to be considered in a limiting sense, because numerous variations are possible. For example, the above technology can be applied to dual clutch transmissions, single clutch transmissions, transmissions having a first number of gear ratios (e.g., six), transmissions having a second number of gear ratios (e.g., ten), and transmissions having various shaft configurations.

The following claims particularly point out certain combinations and sub-combinations regarded as novel and non-obvious. These claims may refer to "an" element or "a first" element or the equivalent thereof. Such claims may be understood to include incorporation of one or more such elements, neither calling for, nor excluding, two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A lubrication system for a transmission, comprising:

a first sump including a first sump drain through hole;

a second sump including a second sump drain through hole, where the second sump is positioned vertically above and spaced apart from the first sump; and a pipe directly connecting the first sump drain through hole and the second sump drain through hole by extending from the first sump drain through hole to the second sump drain through hole, where the first sump drain through hole is located at a bottom of the first sump.

2. The lubrication system of claim 1, where a center of the second sump drain through hole is vertically aligned with a center of the first sump drain through hole.

3. The lubrication system of claim 2, where the first sump drain through hole is circular, and where the second sump drain through hole is circular.

4. The lubrication system of claim 1, further comprising one or more rotatable transmission components that are positioned between the second sump and the first sump, with respect to a vertical axis.

5. The lubrication system of claim 1, further comprising a pump and a conduit extending from the pump to the second sump.

6. The lubrication system of claim 5, where the pump is configured to draw fluid from the first sump directly to the second sump.

7. The lubrication system of claim 1, wherein the pipe is configured to drain transmission fluid from the first sump and the second sump at the same time.

8. The lubrication system of claim 1, further comprising a passage extending from the second sump drain through hole to the first sump drain through hole.

9. The lubrication system of claim 8, further comprising a plug configured to block the first sump drain through hole and the passage.

10. The lubrication system of claim 1, further comprising a pump configured to deliver a fluid to one or more rotatable transmission components.

11. The lubrication system of claim 1, further comprising a pump configured to deliver a fluid from the first sump to the second sump.

12. The lubrication system of claim 1, further comprising a space between the first sump and the second sump.

13. A lubrication system for a transmission, comprising:

a first sump including a first sump drain through hole;

a second sump including a second sump drain through hole, where the second sump is positioned vertically above and spaced apart from the first sump;

a pipe extending from the first sump drain through hole to the second sump drain through hole; and a plug configured to block fluid flow through the pipe and the second sump drain through hole.

14. A method for a transmission of a vehicle, comprising:

integrating a first sump including a first sump drain through hole in the transmission, where the first sump drain through hole is located at a bottom of the first sump;

integrating a second sump including a second sump drain through hole in the transmission, where the second sump is positioned vertically above and spaced apart from the first sump; and integrating a pipe from the first sump drain through hole to the second sump drain through hole.

15. The method of claim 14, further comprising installing a plug into the first sump drain through hole that blocks the first sump drain through hole and the pipe.

16. The method of claim 15, further comprising removing the plug and draining the first sump and the second sump via the first sump drain through hole to replace a fluid in the transmission.

* * * * *